Nov. 19, 1946.   G. W. BLAIR ET AL   2,411,412
SEAT STRUCTURE
Filed May 17, 1943   3 Sheets-Sheet 3
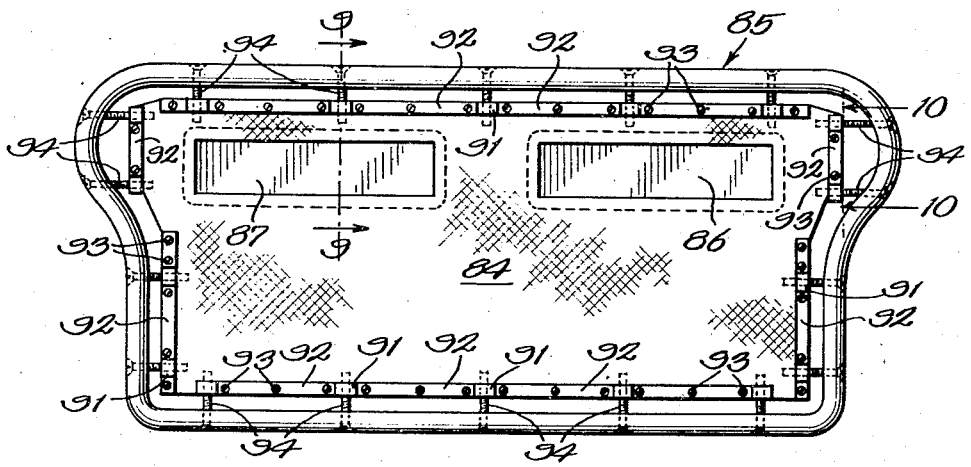
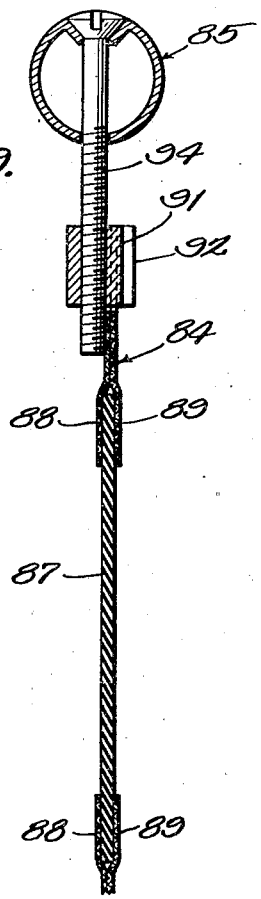
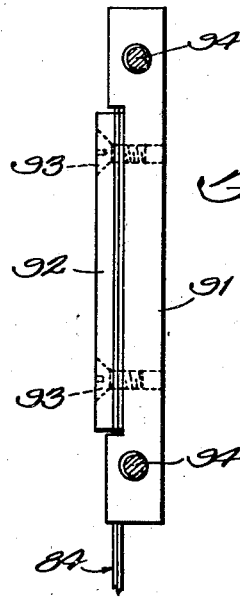
Inventors.
George W. Blair
John F. Schott
Wendell F. Faulk
By Eugene M. Giles Atty.

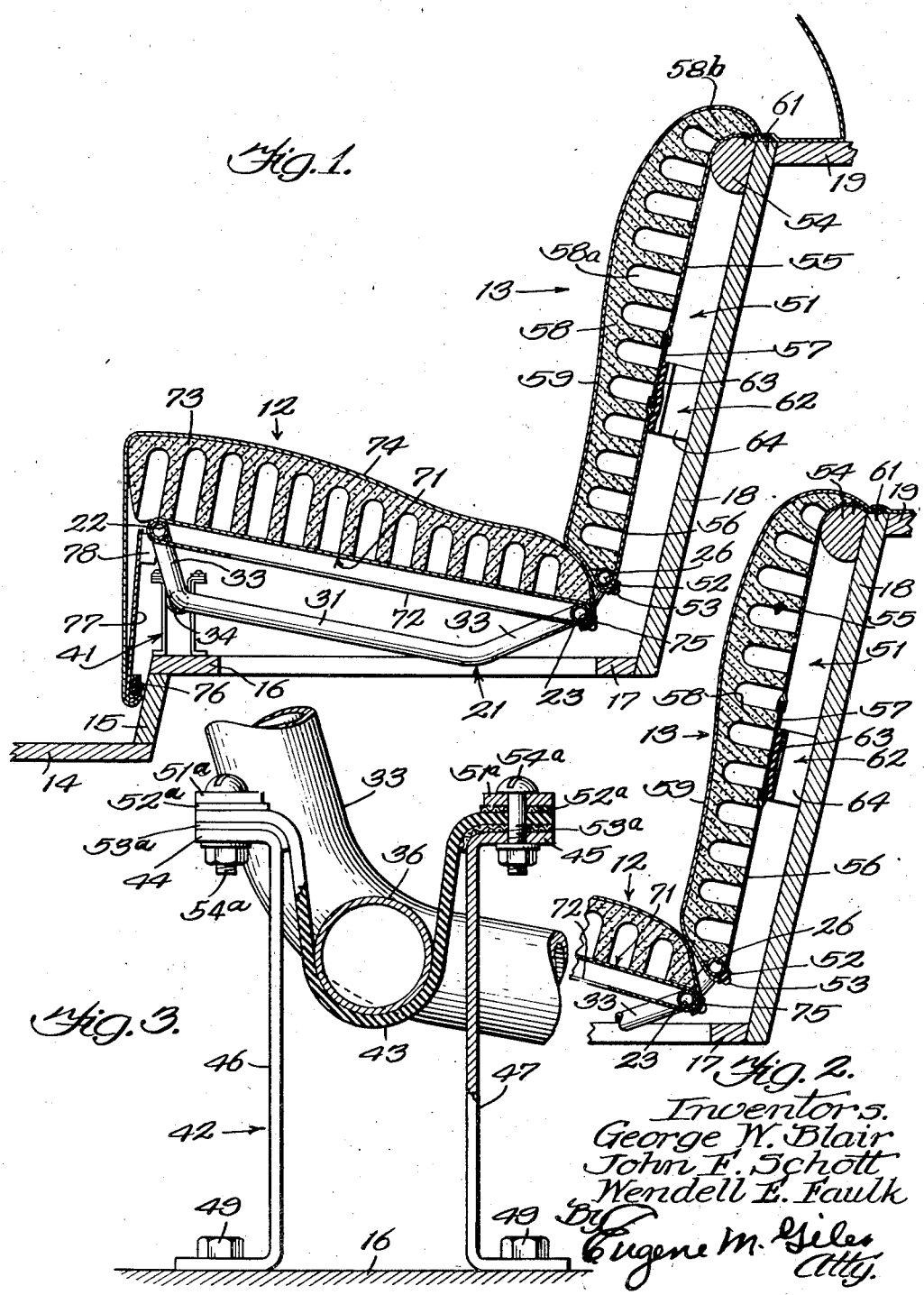

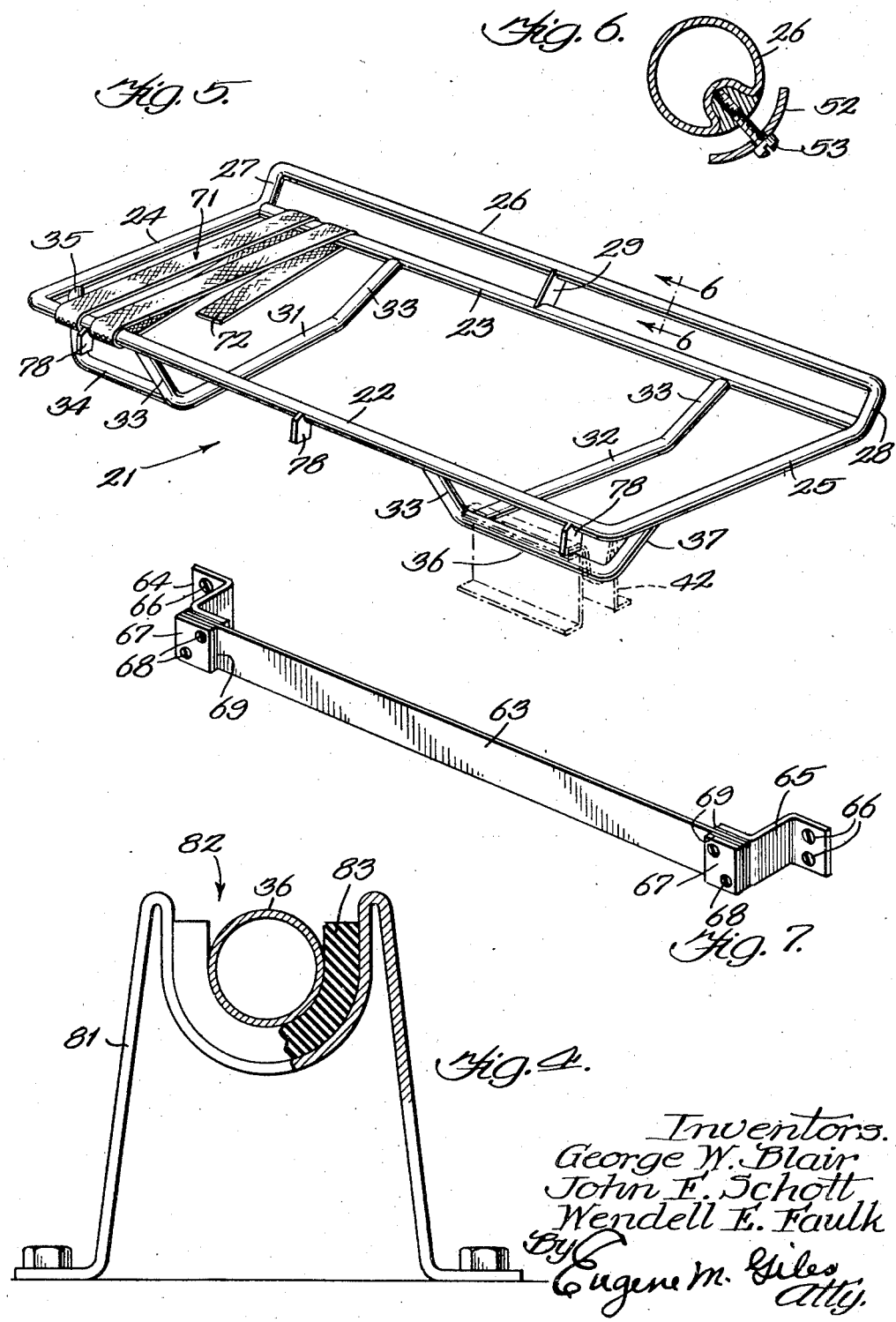

Patented Nov. 19, 1946

2,411,412

UNITED STATES PATENT OFFICE 2,411,412

SEAT STRUCTURE

George W. Blair and John F. Schott, Mishawaka, Ind., and Wendell E. Faulk, Grosse Pointe, Mich., assignors to Mishawaka Rubber and Woolen Manufacturing Company, Mishawaka, Ind., a corporation of Indiana Application May 17, 1943, Serial No. 487,248

5 Claims. (Cl. 155—53)

This invention relates to vehicle seats, and more particularly to a seat suspension, which, while not limited to use in connection with vehicles is particularly applicable thereto.

In this connection it should be noted that the design of a seat for automotive or aeronautical purposes presents certain problems new and different from those encountered in other fields. It will be readily appreciated that in the manufacture of furniture, for example, no special provision need be made for absorbing vibration, but if this important point is neglected in a seat designed for automotive or aircraft use the natural vibration of the vehicle body as caused by the motor and road shocks will be transmitted through the seat in such a manner as to be distressing and extremely tiring to the passenger. It is therefore highly important that provision be made to absorb the vibrational impulses incident to the vehicle body if a satisfactory seat is to be provided. Other problems particularly pertinent in connection with vehicle seats arise from the fact that coil springs such as are ordinarily used in seat constructions are highly sensitive to vibrational impulses and, when vibrating, become objectionable due to the noise they produce; and from the fact that in ordinary seat constructions no special compensation is made for the natural side-sway present in a vehicle body.

It will therefore be seen that it is important that a vehicle seat be so constructed and so supported that it will be silent at all times and will absorb vibrational impulses rather than to transmit them to the body of a passenger seated thereon.

This is accomplished with the present invention by suspending the rear edge of the seat by means of a cushion supporting back panel constructed of fabric and having certain portions thereof formed of rubber in such a manner that the seat back is extensible and may resiliently suspend the rear edge of the seat, while the front edge of the seat is suspended from resilient rubber tension members which are also extensible, and are likewise so arranged as to not only resiliently support the seat for vertical movement, but also to permit lateral movement of the seat within certain limits. Thus the seat frame is provided with a relatively free-floating suspension and is not connected with the vehicle body except through the medium of the rubber. It should be pointed out that due to the high coefficient of hysteresis of rubber, it is readily capable of absorbing the energy of vibrational impulses and the vibration inherent in the vehicle frame is therefore absorbed in the rubber tension members rather than transmitted to the seat.

The principal objects of our invention are to provide a method of and means for suspending a vehicle seat or the like in an improved manner; to provide a silently operating free floating seat suspension adapted to absorb motor vibration and road shocks; to provide a resilient seat back panel adapted to support the rear edge of the seat; and to provide a flexible seat back panel and an auxiliary brace therefor; these and other objects being accomplished as will more fully appear from the following description wherein reference is had to the accompanying drawings in which:

Fig. 1 is a vertical transverse sectional view of an automobile seat embodying features of the present invention.

Fig. 2 is a fragmentary sectional view similar to Fig. 1, but showing the seat back in its extended position.

Fig. 3 is a full size vertical sectional view of one form of the front supports.

Fig. 4 is a full size vertical sectional view of a modified form of front support.

Fig. 5 is a perspective view of the seat frame in its preferred form.

Fig. 6 is a detail sectional view taken on the plane of the line 6—6 in Fig. 5.

Fig. 7 is a perspective view of the kidney brace for supporting and reinforcing the seat back.

Fig. 8 is a plan view of a modified form of seat frame.

Fig. 9 is a detail sectional view taken on the line 9—9 of Fig. 8.

Fig. 10 is a detail sectional view taken on the line 10—10 of Fig. 8.

Referring to the drawings in detail, a seat 12 and seat back 13 have been illustrated in connection with an automobile floor 14, seat base members 15, 16 and 17, a back wall 18 and shelf 19, which may be of any usual form customarily used in the art.

The seat frame 21 is of welded tubular metal construction, comprising a front tube 22, rear tube 23 and side tubes 24 and 25 (see Fig. 5). A rear supporting tube 26 is mounted in spaced relationship to the rear tube 23 by means of angularly extending end portions 27 and 28 and a center brace 29. A pair of cross braces 31 and 32 extend between the front tube 22 and the rear tube 23 and each of these cross braces includes angularly extending end portions 33, so that the cross braces 31 and 32 are offset to lie substantially below the plane established by the front and rear tubes 22 and 23, and the end tubes 24 and 25. A laterally extending tube or trunnion 34 is secured at a point near the front of the cross brace 31, and this trunnion 34 includes an upwardly extending end portion 35 secured to the side tube 24. A similar trunnion 36 is mounted upon the cross brace 32, and has its upwardly extending end portion 37 mounted upon the end tube 25.

A pair of seat supporting brackets 41 and 42 are mounted on the base member 16, and serve to support the seat frame 21 by means of the trunnions 34 and 36. Each of the brackets 41 and 42, in the form shown in Fig. 3, includes a rubber tension member 43 bolted or otherwise secured to the top flanges 44 and 45 of a pair of uprights 46 and 47, which may be secured to the base member 16 in any desired way, as, for example, by means of the bolts 49. In order to firmly secure the rubber tension member to the uprights 46 and 47, it is desirable to provide clamping strips 51a and fabric layers 52a and 53a such that the pressure exerted by the bolt 54a will be uniformly distributed over the surface of the marginal edges of the tension member 43.

It will be readily apparent from the above description that the supports 41 and 42 will be effective to suspend the front edge of the seat frame in such a manner that it is capable of both vertical and pivotal movements, and also of limited lateral movement in all directions. The natural resiliency of the rubber permits a certain degree of movement from side to side, and it will be seen from Fig. 3 that while the tension member 43 tends to center the trunnion 36 between the uprights 46 and 47, it is nevertheless capable of certain movement forwardly or rearwardly.

The rear edge of the seat frame is supported by a flexible back panel 51, having its lower edge clamped to the supporting tube 26, by means of the clamp 52 and screws 53, while its upper edge is nailed to the nailing strip 54 carried by the back wall 18. The back panel 51 is preferably made up of a fabric upper portion 55, a fabric lower portion 56, and a transversely extending rubber insert 57 vulcanized or otherwise secured therebetween in such a manner as to make the entire panel 51 resiliently extensible. The size, shape, and thickness of this rubber insert 57 may be varied in accordance with the degree of flexibility desired in the back panel 51, or the degree of resiliency required to properly support the seat 12. A back cushion 58 is supported by the panel 51 and may be covered by a layer of upholstery 59 having its upper edge nailed to the back panel 18 as indicated at 61 and having its lower edge clamped to the supporting tube 26 by the clamp 52 heretofore mentioned. The cushion 58 is preferably one molded of foam sponge rubber, such as the type formed by whipping an aqueous dispersion of rubber in the presence of a frothing agent or by adding a separately prepared foam to the dispersion, and may be provided with internally extending cavities 58a formed in the molding operation.

It will readily be seen by a comparison of Figs. 1 and 2 of the drawings that the relatively non-extensible upholstery fabric and the back cushion extend between relatively movable points and must be capable of readily following the extension movements of the back panel 51. This is accomplished in the present instance by constructing the cushion 58 of a material that is both extensible, so that it may follow the movements of the panel 51, and compressible, so that it may yield to the tightening action of the upholstery fabric 59 when the back is extended. The sponge or foam rubber previously mentioned has been found highly satisfactory for this purpose.

Moreover, the back cushion 58 is itself so shaped as to eliminate or minimize undue strain upon the upholstery material. To this end there is a substantial roll of foam rubber in the top of the back cushion, indicated at 58b, under the upholstery fabric, which serves as a means of obtaining constant tension on the fabric upholstery material of the back. If this roll were not so used the fabric would come into tension and restrict the movement of the seat on the downward extension. Likewise it would wrinkle when the seat was at its highest point with respect to the floor. The roll of foam at the top eliminates these tendencies. If desired, loosely looped straps of fabric may be attached at their ends to the upper and lower portions 55 and 56 of the back panel 51 to span the rubber insert 57 and thus serve as stop or restraining means to limit the downward extension of the rubber insert at a predetermined point.

A kidney brace 62 may be provided to lend additional support to the flexible back panel 51 and thus more comfortably support the passenger. We prefer to construct the brace (see Fig. 7) by stretching a transversely extending rubber strip 63 between a pair of brackets 64 and 65 mounted on the back wall 18 by screws 66 in such a position that the rubber strip 63 contacts the back panel 51 at a point spaced above its lower edge and lends additional support to the panel at this point. Clamping plates 67 and screws 68 are provided to secure the rubber strip 63 to the brackets 64 and 65, and fabric layers 69 serve to reinforce and grip the rubber at these points.

A seat panel 71 is provided by winding a number of turns of rubberized bias web 72 on the front and rear tubes 22 and 23 of the seat frame 21, in such a manner that a seat cushion 73 may be mounted thereon. The seat panel 71 is preferably constructed in accordance with the teaching of the patent to George W. Blair et al., No. 2,251,318, and has a certain degree of yieldability, and the seat will therefore readily conform to the curvature of the passenger's body even when a relatively thin seat cushion 73, which may be similar to the back cushion 58, is used. As heretofore described, the cross braces 31 and 32 are offset sufficiently so that they will at no time interfere with the proper functioning of the seat panel 71. The latter, moreover, may, if desired, take the form of a prefabricated seat base of the type disclosed in the application of M. M. Cunningham, filed July 26, 1940, Serial No. 347,627.

A layer of fabric upholstering material 74 is provided for the seat cushion 73, and is secured at the rear edge by a clamp 75 carried by the rear tube 23 and similar in construction to the clamp 52 previously described. The front edge of the upholstery fabric 74 may be secured to a nailing strip 76 carried at the lower edge of a depending flange or skirt 77 mounted on the front tube 22 of the seat frame 21 by means of a series of mounting blocks 78 which are preferably welded in position. It will be readily apparent from the drawings that the skirt 78 serves to conceal the seat frame and front supporting brackets, and generally improves the appearance of the seat.

A modified form of front support is shown in Fig. 4, in which a bracket 81 is formed to provide a channel 82 carrying a rubber compression member 83, which supports and partially surrounds one of the trunnions 36. This modification differs from the first described construction principally in that the rubber is here used in compression rather than in tension, since in either construction the degree of resiliency desired may be obtained by varying the thickness and chemical composition of the rubber used.

A modified form of seat panel is illustrated in Figs. 8, 9 and 10. In this construction the seat panel consists of a relatively non-extensible fabric panel 84 stretched upon the seat frame 85 and having rubber inserts as illustrated at 86 and 87 at certain predetermined points to provide the desired yieldability. In practice we prefer to form this panel 84 of two layers 88 and 89 of fabric such that the marginal edges of the rubber inserts 86 and 87 may be securely vulcanized therebetween, as shown in Fig. 9.

The marginal edges of the fabric panel 84 are secured to the tightening strips 91 by means of a number of clamping strips 92 mounted thereon by the screws 93, and these tightening strips 91 are adjustably secured to the frame 85 by a plurality of tension-adjusting screws 94 in such a manner that the initial tension of the panel 84 may be varied in accordance with the adjustment of the adjusting screws 94. The number and size of the adjusting strips required for any given seat will vary according to the size and shape of the frame, the form illustrated having one strip at the front, one at the rear, and two at each end of the seat panel.

While it is believed that the functioning of the seat will be readily apparent to those skilled in the art, it will be briefly reviewed. When a passenger seats himself upon the seat 12, his weight will cause a certain extension of the front rubber tension members 43 and of the transverse rubber insert 57 of the seat back panel 51. The back cushion 58, being of an extensible material, will follow the extension of the panel 51 and will permit the upholstering fabric 59 to move toward the position shown in Fig. 2 without hindering the free extension movements of the seat back. Both the back panel 51 and the seat panel 71 will yield to a certain degree in order that the cushions 58 and 73 may more readily conform to the curvature of the passenger's body; however, the back panel 51 will bear against the tension member 63 of the kidney brace 62 and this brace will therefore lend its support to the back panel 51 at a predetermined desirable point.

As the vehicle moves along the road a greater or lesser degree of vibration is always present in the body portions 14, 15, 16, 17, 18 and 19. However, it will be seen that the construction here described will be highly adaptable to absorb these vibrations before they reach the body of the passenger, since the inertia of the passenger's body and of the seat frame tend to maintain the seat in a steady, vibrationless condition unless acted upon by some outside force, and the suspension means are of such a nature that they will not transmit such force.

This will be readily understood when it is pointed out that the vibratory movements are of relatively high frequency and that as each impulse thereof is transmitted to the rubber extension member it will cause a degree of flexing thereof, but that the so-called "lag" or hysteresis inherent in the rubber will prevent any impulse from being transmitted to the seat unless it acts upon the rubber extension members for a time interval somewhat greater than normally encountered.

A further distinct advantage of the present seat, and one of prime importance in automotive usage, is the fact that it is fully and integrally floating. That is, the entire seat structure functions as a unit due to the integrated seat and back and the two point yieldable suspension. Whereas the conventional seating arrangement is designed with the seat and back functioning as separate units, the present design permits them to travel up and down together. A bad fault of automobile seats of conventional design has been the result of the seat or cushion moving up and down while the back remained stationary. This condition produces frictional heat on the back of the occupant and also causes discomfort by wrinkling and disarranging his clothing. In the present arrangement this fault is entirely eliminated by permitting the seat and back to travel up and down as an integrated unit.

For the purpose of convenience in illustration, the features of our invention have been herein shown and described as specifically embodied in automotive usage. Obviously, however, equal advantage may be derived through the use of the principles of the invention in other fields. Thus the seat construction hereof is admirably suited for use in aircraft, where it will minimize the inherent vibration, and because its arrangement of parts provides a seating structure of minimum weight.

While we have shown and described our invention in a preferred form, we are aware that various changes and modifications may be made therein without departing from the principles of the invention, the scope of which is to be determined by the appended claims.

We claim as our invention:

1. A seat structure of the class described comprising a supporting frame, a seat back comprising a panel of soft flexible yieldingly extensible material attached at its upper end to said supporting frame and a seat bottom comprising a frame fulcrumed near its front to said supporting frame and attached at its rear to the lower end of said panel, said panel being the sole support for the rear end of and held outstretched by the seat bottom frame, and the latter being resiliently supported thereby.

2. A seat structure of the class described comprising a supporting frame, a seat back comprising a panel of soft flexible yieldingly extensible material attached at its upper end to said supporting frame and a seat bottom comprising a frame fulcrumed near its front on a resiliently depressible mounting on said supporting frame and attached at its rear to the lower end of said panel, said panel being the sole support for the rear end of and held outstretched by the seat bottom frame and the latter being resiliently supported thereby.

3. A seat structure of the class described comprising a supporting frame, a seat back comprising a panel of soft flexible yieldingly extensible material attached at its upper end to said supporting frame and a seat bottom comprising a frame fulcrumed near its front to said supporting frame in a fulcrum seat of soft, flexible cushiony material and attached at its rear to the lower end of said panel, said panel being the sole support for the rear end of and held outstretched by the seat bottom frame.

4. A seat structure of the class described comprising a supporting frame, a seat bottom frame, an elastic rubber-like stirrup on said supporting frame and having the forward part of the seat bottom frame fulcrumed therein, and a seat back comprising a panel of soft flexible yieldingly extensible material attached at its upper end to said supporting frame and attached at its lower end to the rear end of the seat bottom frame, said panel being the sole support for the rear end of and held outstretched by the seat bottom frame.

5. A seat structure of the class described comprising a supporting frame, a seat back comprising a cushion interposed between a soft, flexible resiliently extensible backing and a soft flexible facing, said backing and facing being attached at their upper ends to said supporting frame, and a seat bottom comprising a frame fulcrumed near its front to said supporting frame and attached at its rear to the lower ends of said cushion backing and facing, said seat back being the sole support for the rear end of the seat bottom and extensible and compressible by downward movement of said rear end.

GEORGE W. BLAIR.
JOHN F. SCHOTT.
WENDELL E. FAULK.